US011688117B2

(12) United States Patent
Sachson et al.

(10) Patent No.: US 11,688,117 B2
(45) Date of Patent: Jun. 27, 2023

(54) USER EXPRESSIONS IN VIRTUAL ENVIRONMENTS

(71) Applicants: Sony Group Corporation, Tokyo (JP); Sony Corporation of America, New York, NY (US)

(72) Inventors: Thomas Sachson, Malibu, CA (US); Eric Benjamin Fruchter, Los Angeles, CA (US); James Marcus, Culver City, CA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 17/518,136

(22) Filed: Nov. 3, 2021

(65) Prior Publication Data

US 2022/0139018 A1 May 5, 2022

Related U.S. Application Data

(60) Provisional application No. 63/109,492, filed on Nov. 4, 2020.

(51) Int. Cl.
*G06T 13/40* (2011.01)
*G06T 15/10* (2011.01)
*G06T 13/20* (2011.01)

(52) U.S. Cl.
CPC ............ *G06T 13/40* (2013.01); *G06T 13/205* (2013.01); *G06T 15/10* (2013.01)

(58) Field of Classification Search
CPC ........ G06T 13/40; G06T 13/205; G06T 15/10
See application file for complete search history.

(56) References Cited

U.S. PATENT DOCUMENTS 5,152,089 A * 10/1992 Bellico ................... G09F 13/04
40/442
2003/0156135 A1 * 8/2003 Lucarelli ................ G06Q 30/02
715/757

(Continued)

FOREIGN PATENT DOCUMENTS

EP 2175950 A1 4/2010
GB 2505877 A 3/2014

OTHER PUBLICATIONS

Yooki, Things to Know About the PUBG Mobile Companion: Falcon in 2020, article, Apr. 26, 2020, pp. 1-3, Mobile Games.

*Primary Examiner* — Phi Hoang
(74) *Attorney, Agent, or Firm* — Procpio, Cory, Hargreaves & Savitch LLP

(57) ABSTRACT

Methods, systems, and computer-readable storage media providing banner representations in a computer system that provides a virtual environment, including: accessing an avatar record, where the avatar record indicates an avatar representation that includes data to provide a visual representation of an avatar; receiving a selection of a banner representation made by a user; accessing a representation record, wherein the representation record indicates a banner representation that includes data to provide a visual representation of a banner; associating the banner representation with the avatar representation; receiving avatar movement input that indicates movement of the avatar within the virtual environment; and generating visual data representing the movement of the avatar and banner in the virtual environment using the avatar representation and the banner representation, where the banner is placed in the virtual environment following the avatar as the avatar moves in the virtual environment.

19 Claims, 5 Drawing Sheets

(56) References Cited

U.S. PATENT DOCUMENTS

| | | | |
|---|---|---|---|
| 2006/0150104 A1* | 7/2006 | Lira | G06F 3/048 |
| | | | 715/764 |
| 2011/0010316 A1* | 1/2011 | Hamilton, II | G06N 3/006 |
| | | | 709/204 |
| 2019/0197634 A1* | 6/2019 | Dange | G06F 3/011 |
| 2020/0019998 A1* | 1/2020 | Poehler | G06Q 30/018 |
| 2020/0074711 A1* | 3/2020 | Barlier | G06V 40/171 |
| 2020/0245954 A1* | 8/2020 | Kaleal | A61B 5/486 |
| 2021/0193084 A1* | 6/2021 | Deliz Centeno | A63F 13/25 |
| 2021/0252384 A1* | 8/2021 | Li | A63F 13/35 |
| 2022/0066537 A1* | 3/2022 | Govindgari | G06Q 30/08 |

* cited by examiner

USER EXPRESSIONS IN VIRTUAL ENVIRONMENTS

CROSS-REFERENCE TO RELATED APPLICATIONS

This application claims the benefit of priority under 35 U.S.C. § 119(e) of co-pending U.S. Provisional Patent Application No. 63/109,492, filed Nov. 4, 2020, entitled "User Expressions in Virtual Environments". The disclosure of the above-referenced application is incorporated herein by reference.

BACKGROUND

Field

The present disclosure relates to presenting representations in a virtual environment, and more specifically, to providing visual and audio representations or user expressions of movement and actions by avatars in the virtual environment.

Background

A virtual environment is a networked application that allows a user to interact with both the computing environment and the work of other users. However, current virtual environments have limited ways to show expressions of movement and actions.

SUMMARY

The present disclosure provides for visual and audio representations or user expressions of movement and actions by avatars in a virtual environment, presented as visual indications in the environment, such as banners, plumes, auras, and trails in open space.

In one implementation, a method for providing banner representations in a computer system that provides a virtual environment is disclosed. The method includes: accessing an avatar record, where the avatar record indicates an avatar representation that includes data to provide a visual representation of an avatar; receiving a selection of a banner representation made by a user; accessing a representation record, wherein the representation record indicates a banner representation that includes data to provide a visual representation of a banner; associating the banner representation with the avatar representation; receiving avatar movement input that indicates movement of the avatar within the virtual environment; and generating visual data representing the movement of the avatar and banner in the virtual environment using the avatar representation and the banner representation, where the banner is placed in the virtual environment following the avatar as the avatar moves in the virtual environment.

In one implementation, the banner representation includes representation sound data, and further including generating audio data with the visual data using the representation sound data. In one implementation, the banner representation includes representation in any color, size, or shape selected or created by the user. In one implementation, banner representation includes one of patterned or random representation. In one implementation, the banner representation includes representation having at least one of embedded image, video, and emoji. In one implementation, the banner representation includes multiple representations strung together to create at least one of sentences, poems, brand tag lines, lyrics, and musical notes. In one implementation, the banner representation remains in the virtual environment for a set period of time in which the user pays extra to have the banner representation last longer. In one implementation, the banner representation includes at least one of a brand, sports team, artist, and label. In one implementation, the banner representation includes at least one of a walking tour and quest in which people follow the banner representation and learn about representation of the banner representation along the way. In one implementation, the banner representation includes a motion platform that moves with the avatar and presents a visual of the avatar riding on or in the moving platform. In one implementation, the method further includes applying representation and motion indication of the banner representation to other types of representations and information.

In another implementation, a system for providing banner representations in a virtual environment is disclosed. The system includes: an avatar record including avatar representations that include data to provide visual representations of avatars; a representation record including banner representations that include data to provide visual representations of banners; a processor to receive a selection of an avatar made by a user using a user device, the processor to access the avatar record to retrieve the data to provide a visual representation of the selected avatar as an avatar representation, and the processor to receive a selection of a banner made by the user using the user device, the processor to access the representation record to retrieve the data to provide a visual representation of the selected banner as a banner representation; an associator to associate the banner representation with the avatar representation; and a move generator to receive avatar movement input from the user device and generate visual data representing the movement of the selected avatar and the selected banner in the virtual environment, wherein the banner representation is placed in the virtual environment following the avatar representation as the selected avatar moves in the virtual environment, wherein the processor displays the visual data representing the movement of the selected avatar and the selected banner on a visual display.

In one implementation, the banner representation includes representation sound data, and generates audio data with the visual data using the representation sound data. In one implementation, the move generator generates variations in presentation and behavior of the banner representation. In one implementation, the variations in presentation and behavior generated by the move generator include variations in direction with respect to the selected avatar in which the banner representation is positioned including above, sides, or below.

In another implementation, a non-transitory computer-readable storage medium storing a computer program to provide banner representations in a computer that provides a virtual environment is disclosed. The computer program includes executable instructions that cause the computer to: access an avatar record, where the avatar record indicates an avatar representation that includes data to provide a visual representation of an avatar; receive a selection of a banner representation made by a user; access a representation record, wherein the representation record indicates a banner representation that includes data to provide a visual representation of a banner; associate the banner representation with the avatar representation; receive avatar movement input that indicates movement of the avatar within the virtual environment; and generate visual data representing the movement of the avatar and banner in the virtual environment using the avatar representation and the banner representation, wherein the banner is placed in the virtual environment following the avatar as the avatar moves in the virtual environment.

In one implementation, the banner representation includes representation sound data, and further including executable instructions that cause the computer to generate audio data with the visual data using the representation sound data. In one implementation, the banner representation remains in the virtual environment for a set period of time in which the user pays extra to have the banner representation last longer. In one implementation, the banner representation includes at least one of a brand, sports team, artist, and label.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1A:
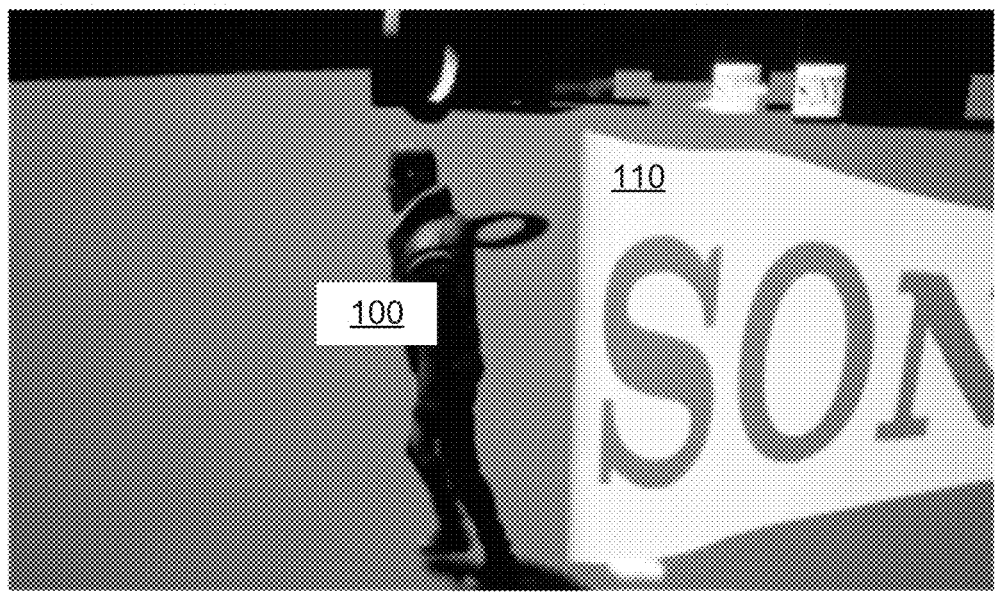
FIG. 1A shows an example of a banner.

As described above, current virtual environments have limited ways to show expressions of movement and actions.

Certain implementations of the present disclosure include apparatus and methods to implement a technique for visual and audio representations or user expressions of movement and actions by avatars in a virtual environment, presented as visual indications in the environment, such as banners, plumes, auras, and trails in the open space. In one implementation, a computer system provides a game or virtual environment, and the motion of an avatar creates personal expressions, music tributes, and/or brand messages as the avatar moves in and through the world. After reading below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in implementations can include, but are not limited to, one or more of the following items: user selection of representations, appearance and behavior; and relationship between representations and content, such as a song or music artist.

In one implementation, representations or user expressions are provided in a virtual environment, where a computer system provides the virtual environment through a server system and client systems. For example, game consoles or mobile devices can connect to a server system through the Internet. The server system stores data representing the virtual environment and avatars for users, and data representing user expressions or representations and representation behaviors for avatars in the virtual environment.

In operation, a user connects the user's client system to the server system. The server system and client systems exchange data to present images and sound representing a virtual environment through the client systems. The user has an avatar and can select aspects of the avatar's appearance and behavior in the virtual environment, including selecting user expressions or representations for the avatar. The user expressions or representations are visual representations in the virtual environment that can be seen on client systems. One example is a green banner shown behind the avatar, with text on the banner. Another example is a white flowing plume or trail with associated music. When a banner is selected for the avatar, as the avatar walks in the virtual environment, the banner follows the path of the avatar and ripples to indicate movement. The banner has text on the banner surface which may indicate the avatar, a message, or content (such as a song or artist). When a plume is selected for the avatar, as the avatar walks in the virtual environment, the plume extends behind the avatar, tracing the path of the avatar movement. In addition, a sound (musical note) is played as the avatar moves. This combination presents a visual and audio experience in the virtual environment that the user can customize and other users can experience through their client systems.

Figure 1B:
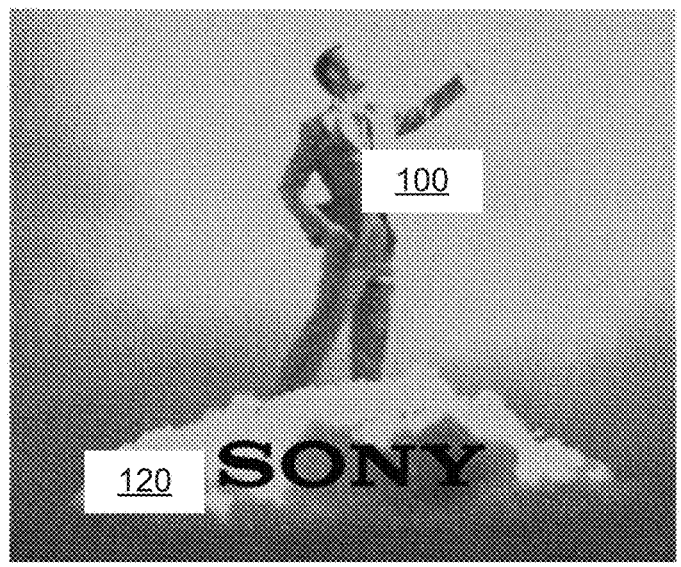
FIG. 1B shows an example of a cloud platform.
Figure 1C:
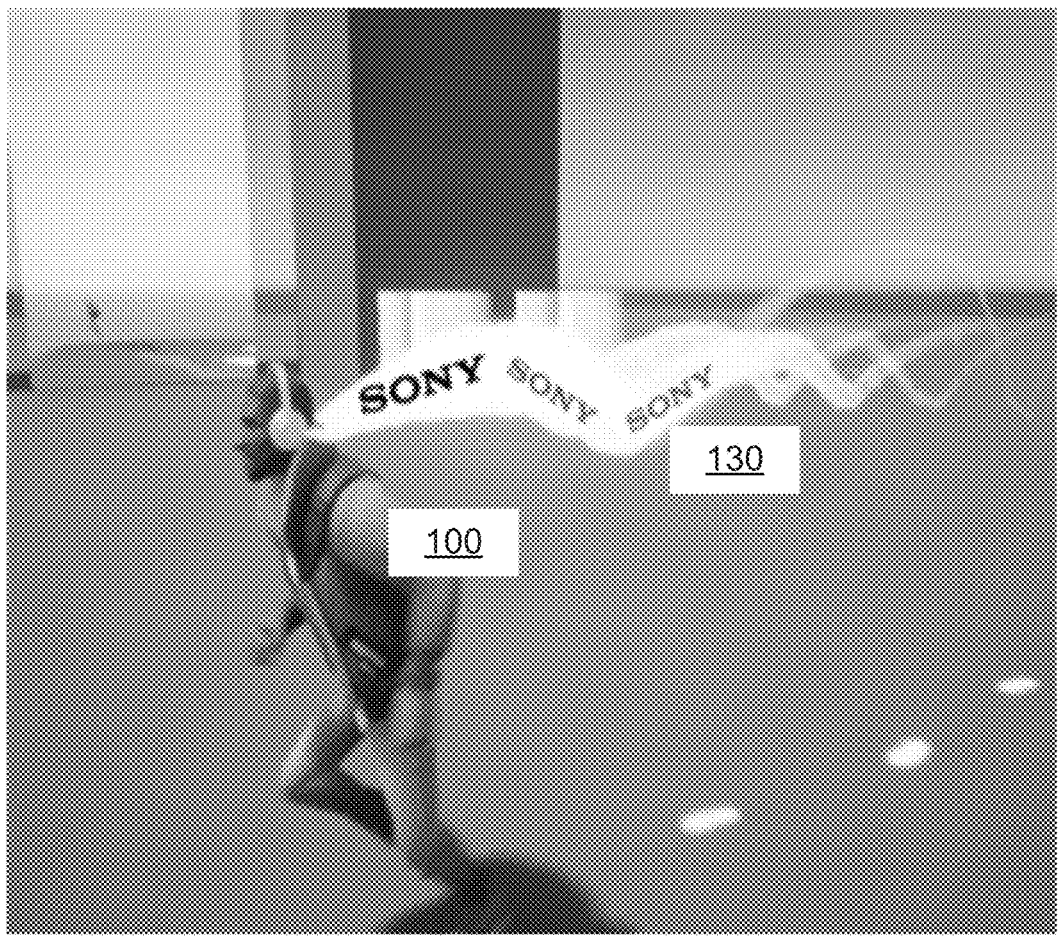
FIG. 1C shows an example of a plume.

FIGS. 1A-1C show examples of an image of an avatar 100 with representations.

FIG. 1A shows an example of a banner 110.
FIG. 1B shows an example of a cloud platform 120.
FIG. 1C shows an example of a plume 130.

In one implementation, the virtual environment is provided as an online music experience. The representations are used to enhance the user experience and provide opportunities for social expression and interaction. For example, the representations can provide visual and musical expression of the user's musical interests, such as through artist or album images, songs, music, and lyrics.

In another implementation, the virtual environment is provided as an online game experience. The representations are used to enhance the game user experience. For example, the representations can provide visual and sound expression of the user's game performance or social interaction, such as shapes, colors, or sounds related to a player's performance or group affiliations. In one example, avatars on the same team in a game each have banners, auras, or plumes that match in color and sound.

In one implementation, players can purchase or activate representations for commercialization. For example, a player can purchase a representation in a game, with proceeds of the sale and royalties for use going to one or more entities, such as the game provider, a content provider, and a brand company. In one example, a player buys a banner or cape designed to match a clothing brand with a relationship to a music artist. The money for the sale is split among the game provider, the clothing company, and the artist. Similarly, the game developer may pay a royalty or fee to the clothing company and the artist as the cape is used in game (or reversed, receive a royalty from the shoe company and artist). In a music environment example, music by an artist is played as representations are used in movement, a royalty is paid to the artist based on the amount of the artist's music played.

Figure 2:
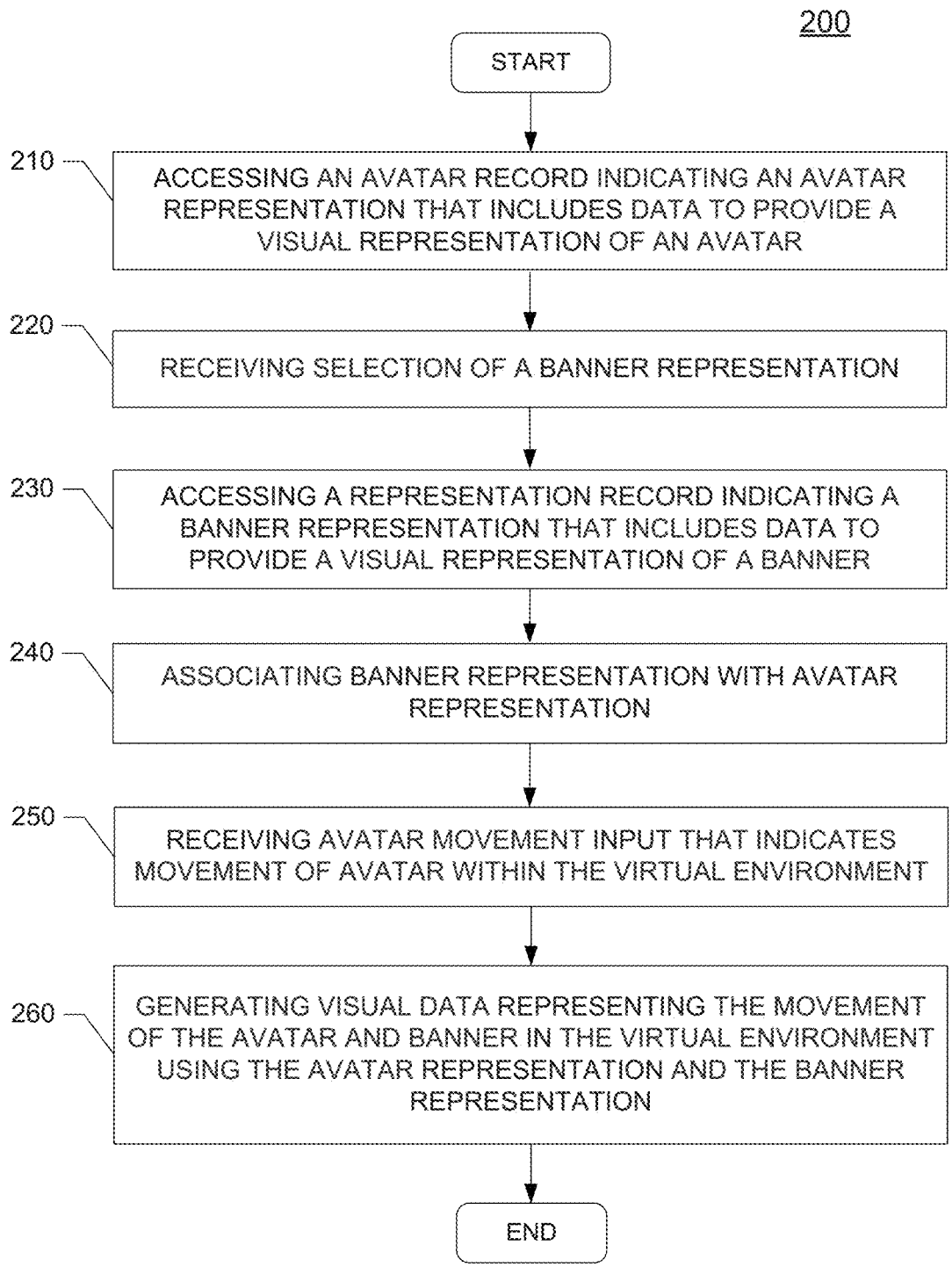
FIG. 2 is a flow diagram of a method for providing banner representations in a computer system that provides a virtual environment in accordance with one implementation of the present disclosure.

FIG. 2 is a flow diagram of a method 200 for providing banner representations in a computer system that provides a virtual environment in accordance with one implementation of the present disclosure.

In the illustrated implementation of FIG. 2, the method 200 includes accessing, at block 210, an avatar record indicating an avatar representation that includes data to provide a visual representation of an avatar. A selection of a banner representation is received, at block 220. A representation record indicating a banner representation that includes data to provide a visual representation of a banner is accessed, at block 230. The banner representation is then associated with the avatar representation, at block 240.

Example implementations of various representations and behavior include, but are not limited to, alone or in combination: representations can be any color, size, or shape selected or created by a user; representations can vary in pattern (i.e., patterned or random); representations can use set shapes, such as capes, flags, sashes, clouds, and halos; representations can have any text (e.g., single letter, to partial words, to words in sequence) embedded in them or presented near them; representations can be letters or texts (without a surrounding image); representations can have any image, video, and/or emoji embedded in them; multiple representations can be strung together to create sentences, poems, brand tag lines, lyrics, and/or musical notes; representations can be selected by user from pre-existing selection or customized by user; letters, words, images, videos embedded in representations can be sold, earned, gifted, or given away from/to user; representations can remain for minutes, hours, days in which the user may pay extra to have representations last longer; representations can be only visible by certain types of other players if designated by the representation creator; representation can help other players find each other (e.g., games like hide and seek enabled); selected images, words, sounds, such as bad words and/or hate speech, can be restricted; brands can reward users (coins, merch, contests) for stamping their logos as the users walk through the virtual world; scarcity aspect can be implemented; brands (e.g., CPG, services, etc.), sports teams, artists, and/or labels can pay for messages created and seen; brands can pay more for representations to last longer; representations can be paint, flames, ice, and/or embossed; representations can have Easter eggs and/or prizes in them, if another user interacts with them accordingly (prize from brand and/or artist); and representations can have walking tours and/or quests where people follow representations and learn about music along the way.

In another implementation, representations can be motion platforms that move with the avatar, presenting a visual of the avatar riding on or in the representation. For example, a cloud platform with an avatar standing on the cloud, or a magic carpet platform (e.g., FIG. 1B).

In the illustrated implementation of FIG. 2, the method 200 further includes receiving, at block 250, avatar movement input that indicates movement of the avatar within the virtual environment, and generating, at block 260, visual data representing the movement of the avatar and banner in the virtual environment using the avatar representation and the banner representation. In one implementation, the banner is placed in the virtual environment following the avatar as the avatar moves in the virtual environment. In one implementation, the banner representation includes representation sound data, and further includes generating audio data with the visual data using the representation sound data.

Some implementations apply the representation of representations and motion indication to other types of representations and information. Examples include, but are not limited to, alone or in combination: map tools to show movement of objects or users (e.g., a trail can help a user locate another user); trails or paths showing movement of other objects or user tools, such as a cursor, sight, or eyeline; and a motion indication in medical imaging with customizable visual and audio representations (e.g., tracked cells leave a selected type of trail).

Figure 3:
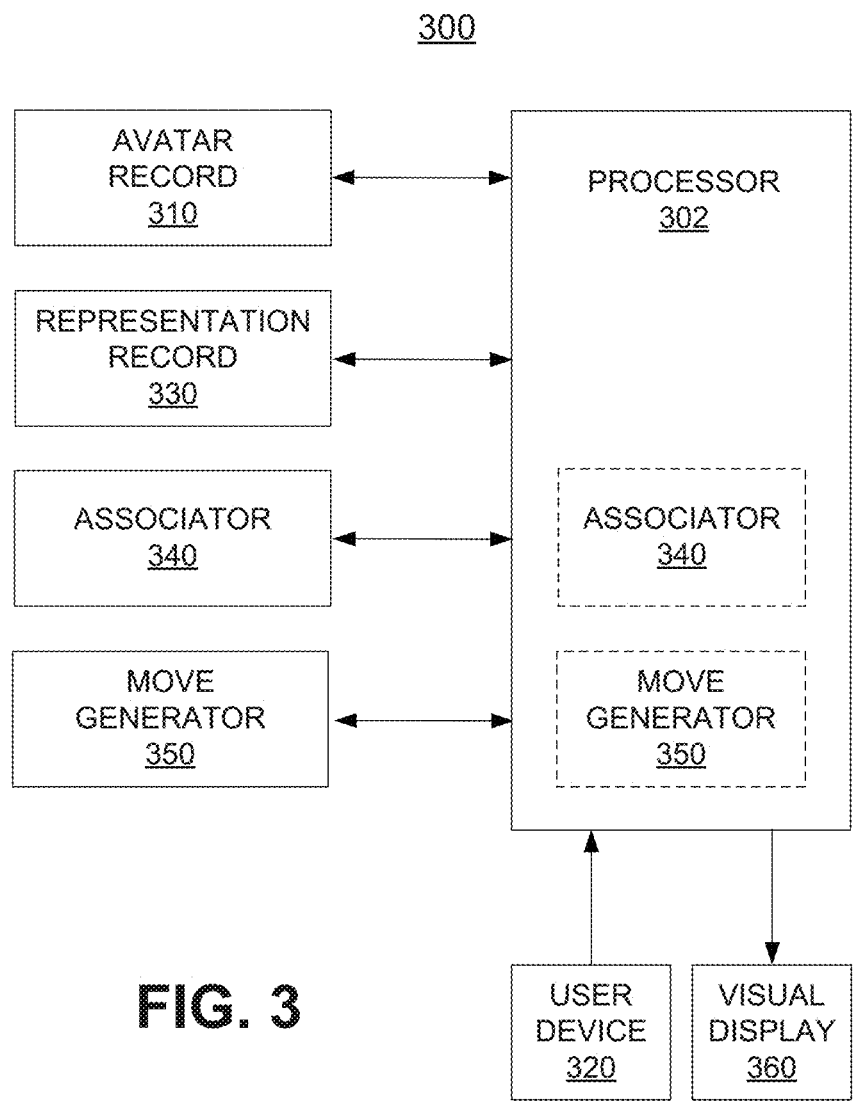
FIG. 3 is a block diagram of a system for providing banner representations in the virtual environment in accordance with one implementation of the present disclosure.

FIG. 3 is a block diagram of a system 300 for providing banner representations in the virtual environment in accordance with one implementation of the present disclosure. In the illustrated implementation of FIG. 3, the system 300 includes a processor 302, avatar record 310, representation record 330, an associator 340, a move generator 350, a user device 320, and a visual display 360. In an alternative implementation, the associator 340 and the move generator 350 are situated within the processor 302.

In one implementation, a user or player selects a representation of an avatar using a user device 320 and sends the selection to the processor 302. The processor 302 accesses the avatar record 310 which includes avatar representations that include data to provide visual representations of avatars.

In one implementation, the user or player also selects a banner representation using the user device 320 and sends the selection to the processor 302. The processor 302 accesses the representation record 330 which includes banner representations that include data to provide visual representations of banners.

In one implementation, the processor 302 receives a selection of an avatar made by the user using the user device 320. The processor 302 accesses the avatar record 310 to retrieve the data to provide a visual representation of the selected avatar as an avatar representation.

In one implementation, the processor 302 also receives a selection of a banner made by the user using the user device 320. The processor 302 accesses the representation record 330 to retrieve the data to provide a visual representation of the selected banner as a banner representation.

In one implementation, the associator 340 associates the banner representation accessed from the representation record 330 with the avatar representation accessed from the avatar record 310.

In one implementation, the move generator 350 receives avatar movement input from the user device and generates visual data representing the movement of the selected avatar and the selected banner in the virtual environment using the avatar representation and the banner representation, respectively. In one implementation, the banner is placed in the virtual environment following the avatar representation as the selected avatar moves in the virtual environment. In one implementation, the banner representation includes representation sound data, and further includes generating audio data with the visual data using the representation sound data.

In one implementation, the processor 302 displays the visual data on the visual display 360.

In other implementations, the server system (e.g., the system 300) and client systems (e.g., user device 320) provide variations in the presentation and behavior of representations. Examples include, but are not limited to, alone or in combination: representations can be positioned relative to the avatar in any direction, such as above, sides, or below (e.g., a rain cloud above the avatar, birds circling the avatar's head, or a trail of notes following the avatar); representations can be placed on or passed to another avatar or object in the environment, such as creating a halo over another avatar or a green cloud near another avatar, or placing an aura around a doorway; representations can be combined, such as a banner and an aura; representations can be dynamic, changing over time or with other environment changes, such as time of day or avatar status; representations can interact with other presentations or avatar properties, causing different effects (e.g., representations for an avatar flash quickly when the avatar is near another avatar or representation for an avatar that shares musical favorites, for example, based on user information stored by the server system or the client systems); and representations can be subjective so that they appear different to different avatars, such as different images or text for friends and for public, or targeted advertising, or depending on the nature of the client system (e.g., an animated image for a game console and a static image for a mobile device).

Figure 4A:
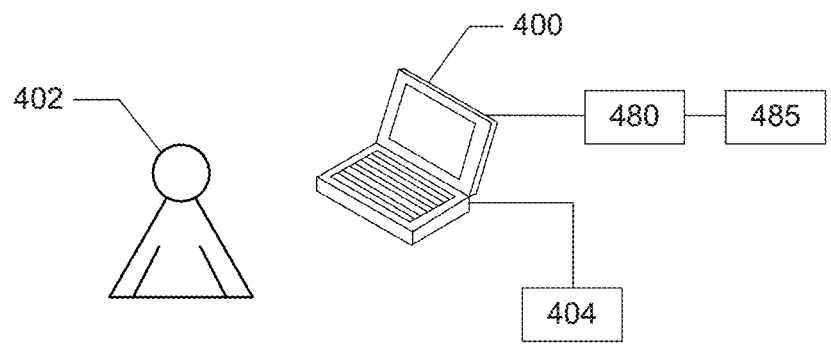
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application 490 for providing banner representations as illustrated and described with respect to the method 200 in FIG. 2 and the system 300 in FIG. 3.

Figure 4B:
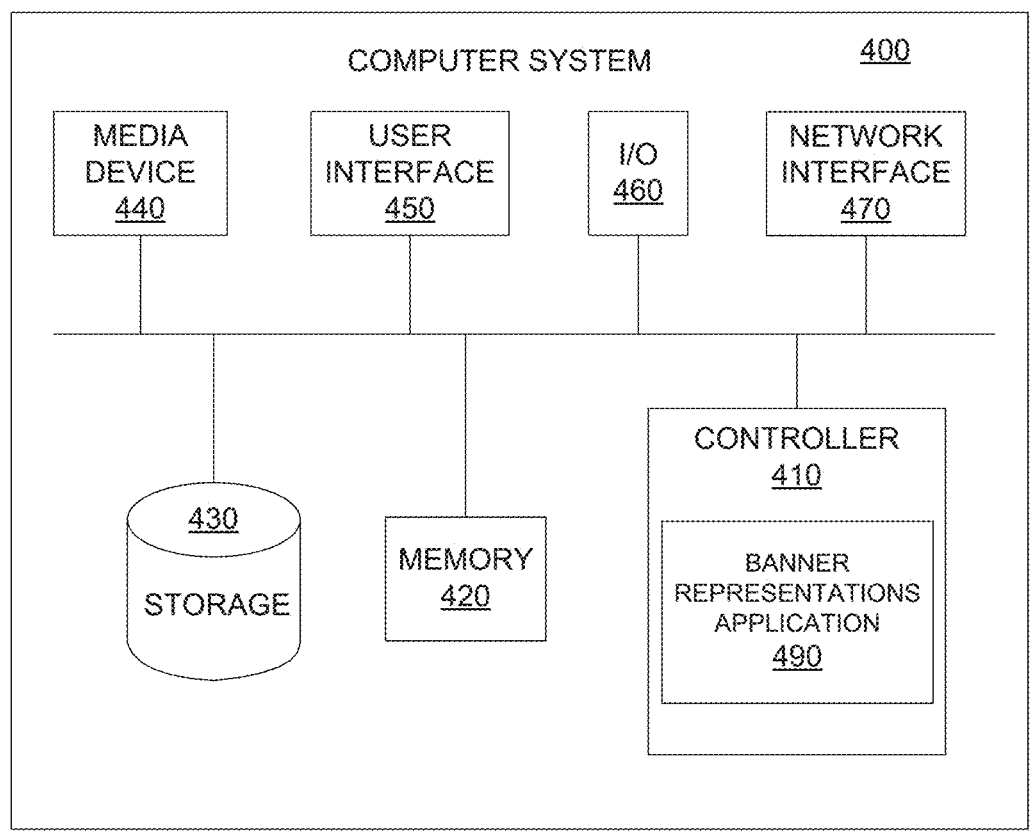
FIG. 4B is a functional block diagram illustrating the computer system hosting a banner representation application in accordance with an implementation of the present disclosure.

The computer system 400 stores and executes the banner representation application 490 of FIG. 4B. In addition, the computer system 400 may be in communication with a software program 404. Software program 404 may include the software code for the banner representation application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the banner representation application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the banner representation application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the banner representation application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the banner representation application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one implementation, the system 300 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 300 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of the above-discussed examples are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for providing banner representations in a computer system that provides a virtual environment, the method comprising:
   accessing an avatar record, where the avatar record indicates an avatar representation that includes data to provide a visual representation of an avatar;
   receiving a selection of a banner representation made by a user;
   accessing a representation record, wherein the representation record indicates the banner representation that includes data to provide a visual representation of a banner,
   wherein the banner representation includes at least one of a walking tour and quest in which people follow the banner representation and learn about representation of the banner representation along the way;
   associating the banner representation with the avatar representation;
   receiving avatar movement input that indicates movement of the avatar within the virtual environment; and
   generating visual data representing the movement of the avatar and banner in the virtual environment using the avatar representation and the banner representation,
   where the banner is placed in the virtual environment following the avatar as the avatar moves in the virtual environment.

2. The method of claim 1, wherein the banner representation includes representation sound data, and
   further comprising generating audio data with the visual data using the representation sound data.

3. The method of claim 1, wherein the banner representation includes representation in any color, size, or shape selected or created by the user.

4. The method of claim 1, wherein the banner representation includes one of patterned or random representation.

5. The method of claim 1, wherein the banner representation includes representation having at least one of embedded image, video, and emoji.

6. The method of claim 1, wherein the banner representation includes multiple representations strung together to create at least one of sentences, poems, brand tag lines, lyrics, and musical notes.

7. The method of claim 1, wherein the banner representation remains in the virtual environment for a set period of time in which the user pays extra to have the banner representation last longer.

8. The method of claim 1, wherein the banner representation includes at least one of a brand, sports team, artist, and label.

9. The method of claim 1, wherein the banner representation includes a motion platform that moves with the avatar and presents a visual of the avatar riding on or in the moving platform.

10. The method of claim 1, further comprising applying representation and motion indication of the banner representation to other types of representations and information.

11. A system for providing banner representations in a virtual environment, the system comprising:
    an avatar record including avatar representations that include data to provide visual representations of avatars;
    a representation record including banner representations that include data to provide visual representations of banners;
    a processor to receive a selection of an avatar made by a user using a user device, the processor to access the avatar record to retrieve the data to provide a visual representation of the selected avatar as an avatar representation, and
    the processor to receive a selection of a banner made by the user using the user device, the processor to access the representation record to retrieve the data to provide a visual representation of the selected banner as a banner representation;
    an associator to associate the banner representation with the avatar representation; and
    a move generator to receive avatar movement input from the user device and generate visual data representing the movement of the selected avatar and the selected banner in the virtual environment,
    wherein the banner representation includes at least one of a walking tour and quest in which people follow the banner representation and learn about representation of the banner representation along the way,
    wherein the banner representation is placed in the virtual environment following the avatar representation as the selected avatar moves in the virtual environment,
    wherein the processor displays the visual data representing the movement of the selected avatar and the selected banner on a visual display.

12. The system of claim 11, wherein the banner representation includes representation sound data, and generates audio data with the visual data using the representation sound data.

13. The system of claim 11, wherein the move generator generates variations in presentation and behavior of the banner representation.

14. The system of claim 13, wherein the variations in presentation and behavior generated by the move generator comprise
    variations in direction with respect to the selected avatar in which the banner representation is positioned including above, sides, or below.

15. A method for providing banner representations in a computer system that provides a virtual environment, the method comprising:
    accessing an avatar record, where the avatar record indicates an avatar representation that includes data to provide a visual representation of an avatar;
    receiving a selection of a banner representation made by a user;
    accessing a representation record, wherein the representation record indicates the banner representation that includes data to provide a visual representation of a banner, wherein the banner representation includes a motion platform that moves with the avatar and presents a visual of the avatar riding on or in the moving platform;

associating the banner representation with the avatar representation;

receiving avatar movement input that indicates movement of the avatar within the virtual environment; and generating visual data representing the movement of the avatar and banner in the virtual environment using the avatar representation and the banner representation, where the banner is placed in the virtual environment following the avatar as the avatar moves in the virtual environment.

16. A non-transitory computer-readable storage medium storing a computer program to provide banner representations in a computer that provides a virtual environment, the computer program comprising executable instructions that cause the computer to:

access an avatar record, where the avatar record indicates an avatar representation that includes data to provide a visual representation of an avatar;

receive a selection of a banner representation made by a user;

access a representation record, wherein the representation record indicates the banner representation that includes data to provide a visual representation of a banner, wherein the banner representation includes at least one of a walking tour and quest in which people follow the banner representation and learn about representation of the banner representation along the way;

associate the banner representation with the avatar representation;

receive avatar movement input that indicates movement of the avatar within the virtual environment; and generate visual data representing the movement of the avatar and banner in the virtual environment using the avatar representation and the banner representation, wherein the banner is placed in the virtual environment following the avatar as the avatar moves in the virtual environment.

17. The computer-readable storage medium of claim 16, wherein the banner representation includes representation sound data, and further comprising executable instructions that cause the computer to generate audio data with the visual data using the representation sound data.

18. The computer-readable storage medium of claim 16, wherein the banner representation remains in the virtual environment for a set period of time in which the user pays extra to have the banner representation last longer.

19. The computer-readable storage medium of claim 16, wherein the banner representation includes at least one of a brand, sports team, artist, and label.

* * * * *